United States Patent
Brown et al.

(10) Patent No.: US 7,103,606 B2
(45) Date of Patent: Sep. 5, 2006

(54) METHOD AND APPARATUS FOR REMOVING INFORMATION FROM A SERVER

(75) Inventors: Michael Wayne Brown, Georgetown, TX (US); Michael Aaron Kaply, Austin, TX (US); Aaron Keith Reed, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/884,490

(22) Filed: Jun. 18, 2001

(65) Prior Publication Data

US 2003/0009465 A1 Jan. 9, 2003

(51) Int. Cl.
*G06F 17/30* (2006.01)

(52) U.S. Cl. ....................................... 707/102
(58) Field of Classification Search ................ 707/102; 705/26
See application file for complete search history.

(56) References Cited

U.S. PATENT DOCUMENTS

| | | | | |
|---|---|---|---|---|
| 5,799,086 A | * | 8/1998 | Sudia | 705/76 |
| 5,808,612 A | * | 9/1998 | Merrick et al. | 715/775 |
| 5,864,853 A | * | 1/1999 | Kimura et al. | 707/10 |
| 5,872,916 A | * | 2/1999 | Fukuoka et al. | 713/202 |
| 6,135,646 A | * | 10/2000 | Kahn et al. | 709/217 |
| 6,151,643 A | * | 11/2000 | Cheng et al. | 710/36 |
| 6,269,394 B1 | * | 7/2001 | Kenner et al. | 709/217 |
| 6,275,941 B1 | * | 8/2001 | Saito et al. | 713/201 |
| 6,275,942 B1 | * | 8/2001 | Bernhard et al. | 713/201 |
| 6,324,569 B1 | * | 11/2001 | Ogilvie et al. | 709/206 |
| 6,330,598 B1 | * | 12/2001 | Beckwith et al. | 709/223 |
| 6,341,353 B1 | * | 1/2002 | Herman et al. | 713/201 |
| 6,343,280 B1 | * | 1/2002 | Clark | 705/55 |
| 6,369,840 B1 | | 4/2002 | Barnett et al. | |
| 6,377,259 B1 | * | 4/2002 | Tenev et al. | 345/440 |
| 6,385,596 B1 | * | 5/2002 | Wiser et al. | 705/51 |
| 6,523,036 B1 | * | 2/2003 | Hickman et al. | 707/10 |
| 6,587,836 B1 | * | 7/2003 | Ahlberg et al. | 705/26 |
| 6,615,224 B1 | * | 9/2003 | Davis | 707/202 |
| 6,889,214 B1 | * | 5/2005 | Pagel et al. | 705/410 |
| 6,968,317 B1 | * | 11/2005 | Wallace et al. | 705/37 |
| 6,990,478 B1 | * | 1/2006 | Loy et al. | 707/1 |
| 2001/0044894 A1 | * | 11/2001 | Saito et al. | 713/156 |
| 2001/0051996 A1 | * | 12/2001 | Cooper et al. | 709/217 |
| 2002/0010638 A1 | * | 1/2002 | Fischer | 705/26 |
| 2002/0032731 A1 | | 3/2002 | Qian et al. | |
| 2002/0073043 A1 | * | 6/2002 | Herman et al. | 705/64 |
| 2002/0111886 A1 | * | 8/2002 | Chenevich et al. | 705/30 |
| 2003/0120557 A1 | * | 6/2003 | Evans et al. | 705/26 |

* cited by examiner

*Primary Examiner*—Frantz Coby
(74) *Attorney, Agent, or Firm*—Duke W. Yee; Mark S. Walker; Francis Lammes (57) ABSTRACT

A method and apparatus for managing confidential information in a data processing system server. Information is received from a plurality of users. The information is stored on a server for many different uses and in many different files and databases. A request is received from the client to remove specific selected information from the stored information for a user within the set of users, wherein the selected information is received in response to a transaction involving that user. In response to receiving the request, the selected information is removed from the stored information, thus maintaining the privacy requests of that user.

26 Claims, 6 Drawing Sheets

METHOD AND APPARATUS FOR REMOVING INFORMATION FROM A SERVER

CROSS REFERENCE TO RELATED APPLICATIONS

The present invention is related to Method and Apparatus for Removing Confidential Information from a History, Ser. No. 09/884,493, and Method and Apparatus for Viewing and Managing Information in a History, Ser. No. 09/884,491, filed even date hereof, assigned to the same assignee, and incorporated herein by reference

BACKGROUND OF THE INVENTION

1. Technical Field

The present invention relates generally to an improved data processing system, and in particular to a method and apparatus for managing data. Still more particularly, the present invention provides a method, apparatus, and computer implemented instructions for removing specific personal or confidential information from a server.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients affect data transfers using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. A URL identifies each logical block of information accessible to a client, called a "page" or a "Web page". The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

There are a number of ways to find out what Web pages have been viewed in a browser. For example, a disk cache is present in which various files, such as graphic images, are stored with respect to a Web page. Additionally, a history list is often recorded to identify URLs visited by a user. Also, a location list containing URLs entered by the user is present. Other types of disk caches include cookies for various Web sites, which are stored in a cookie file for the browser. This recorded information is an example of a history that may be recorded for a Web page received by a user or a Web site visited by the user. These histories also may contain confidential or personal information.

In some instances, a user may desire to prevent others from identifying confidential or personal information that may be located in history. Currently, a user is able to remove this information from the data processing system at which the user is located. As recognized by the present invention, the user is unable to control the storage or retention of personal or confidential information on a server. For example, if a user purchases an item from a Web site, the user may provide a credit card number as well as a name and address to facilitate the purchase and delivery of the item. Currently, the user is unable to remove this information from the server. As a result, the user is unable to control who has access to personal or confidential information.

Therefore, it would be advantageous to have an improved method and apparatus for removing information from a server.

SUMMARY OF THE INVENTION

The present invention provides for a method and apparatus for managing confidential information in a data processing system server. Information is received from a plurality of users. The information is stored on a server for many different uses and in many different files and databases. A request is received from the client to remove specific selected information from the stored information for a user within the set of users, wherein the selected information is received in response to a transaction involving that user. In response to receiving the request, the selected information is removed from the stored information, thus maintaining the privacy requests of that user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
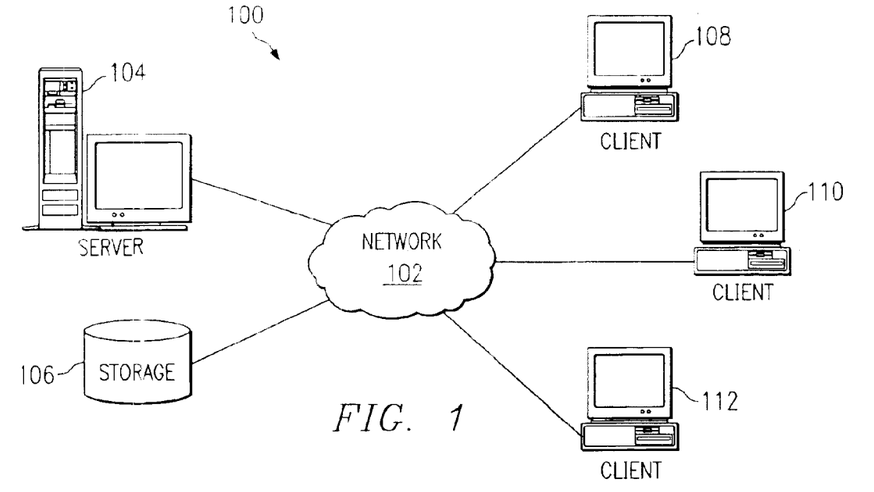
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
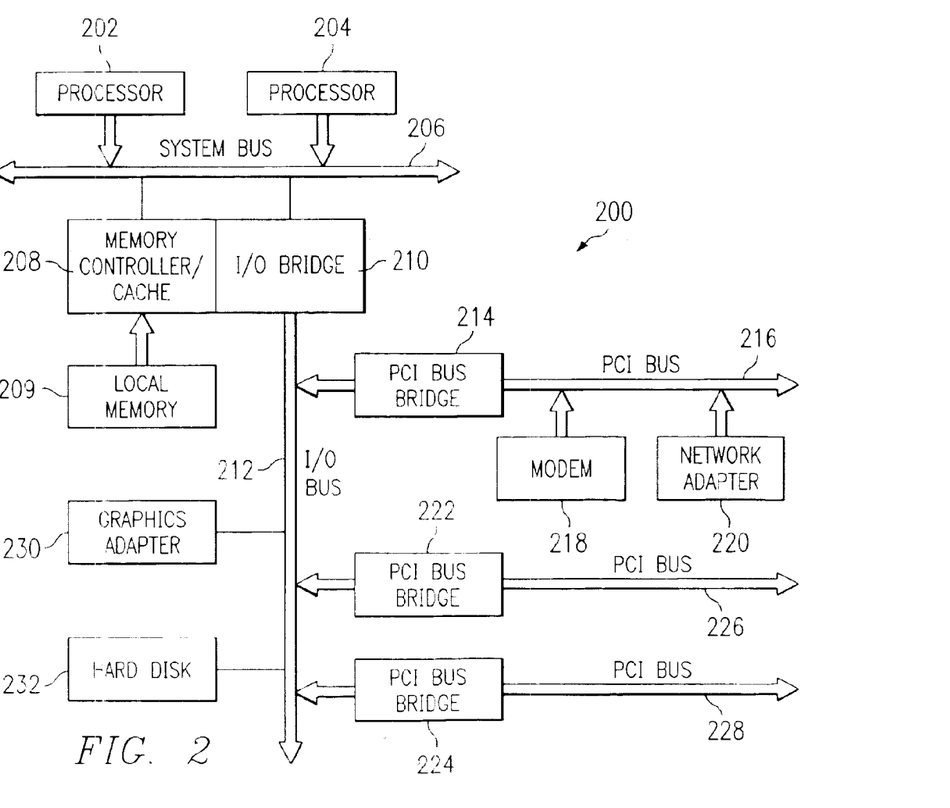
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
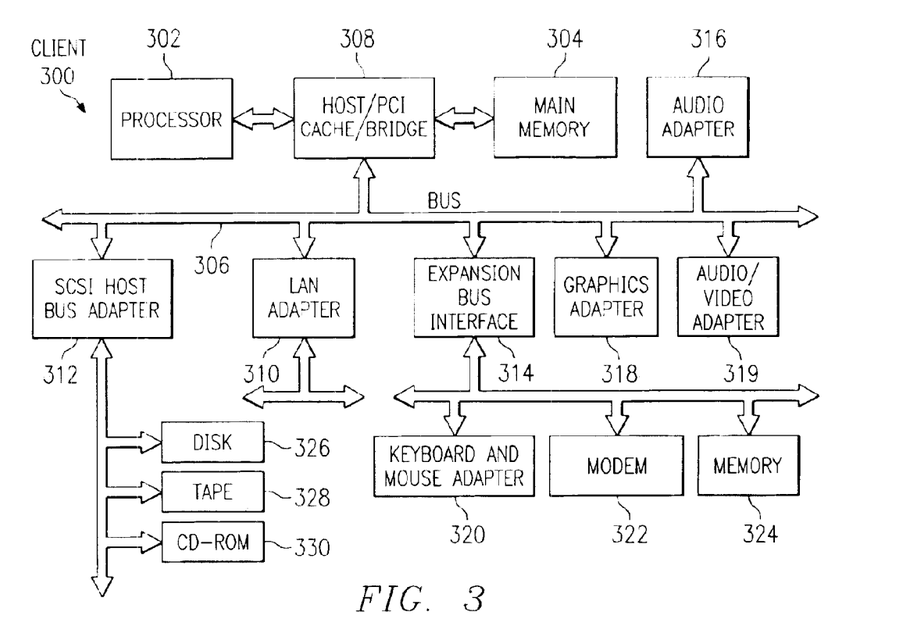
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
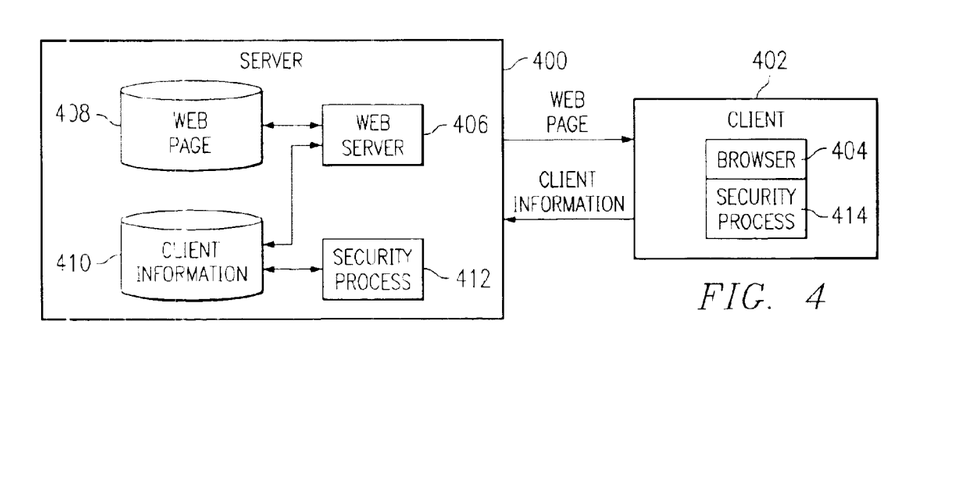
FIG. 4 is a diagram of components used to manage and remove information from a server in accordance with a preferred embodiment of the present invention.

Turning next to FIG. 4, a diagram of components used to manage and remove information from a server is depicted in accordance with a preferred embodiment of the present invention. In this example, server 400 may send a Web page to client 402. This Web page is displayed in browser 404. The Web page is sent by Web server 406 from Web page database 408. Depending on the particular requests, different Web pages may be selected from or generated from Web page database 408 for display at browser 404. The Web page may request personal or confidential information, such as, for example, a name, a user identification, a password, a phone number, a personal identification number, a physical address, an e-mail address, a credit card number, a social security number, or a birth date. This information also is referred to as client information.

The information returned by a user at client 402 is received by Web server 406 and stored in client information database 410. In many cases, the information is only required for a short period of time. For example, a credit card number would not be required after a transaction between a user and a business has been completed. When the validity of the credit card number has been verified and payment has been confirmed, the business no longer has a need to retain the credit card number. Similarly, other information, such as a phone number or a birth date may no longer be required or needed for the purpose for which the user sent the information. The transaction also may take other forms other than commercial transactions. For example, the transaction may be for obtaining access to a Web site in which a user name and password are required. The transaction also may be one in which a user provides information in response to a request from a server, such as a questionnaire in a Web page.

The present invention provides an improved method, apparatus, and computer implemented instructions for managing personal or confidential information on a server. The mechanism of present invention allows a user to request the removal of specific personal or confidential information from a server. In these examples, security process 412 in server 400 and security process 414 in browser 404 provide a mechanism for identifying and removing personal and confidential information. A user may identify personal or confidential information sent to server 400 through security process 414. A request may be generated and sent to server 400 to remove this information. The request is received by Web server 406 and sent to security process 412 for handling. If the information is no longer required for a particular transaction, security process 412 removes the information from client information database 410. A confirmation is then returned to the user at client 402, indicating that the information has been removed. If the information is still required for the transaction, such a notice is returned to the user.

Figure 5:
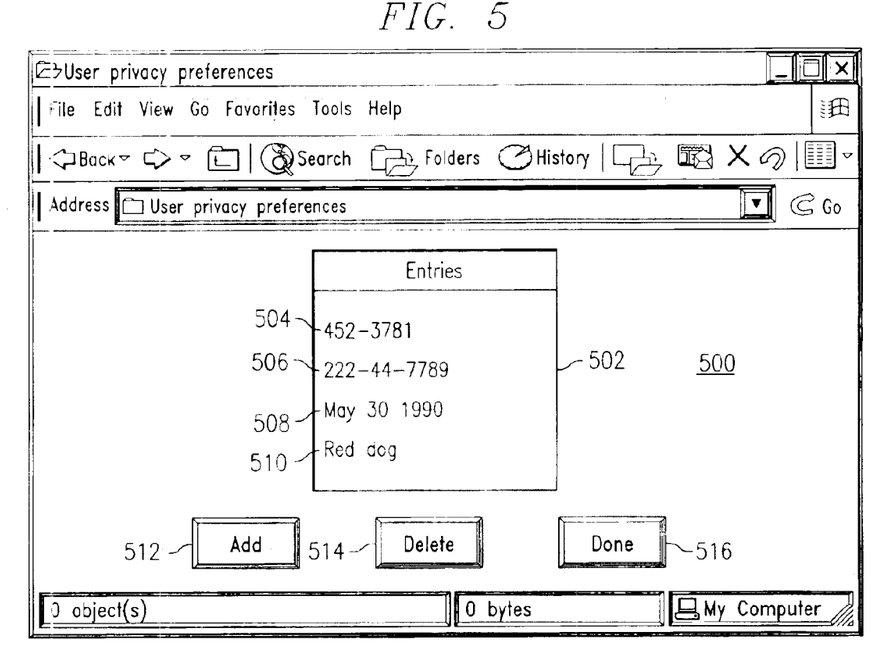
FIG. 5 is a diagram of graphical user interface for defining privacy preferences in accordance with a preferred embodiment of the present invention.

With reference now to FIG. 5, a diagram of graphical user interface for defining privacy preferences is depicted in accordance with a preferred embodiment of the present invention. Window 500 is an example of a graphical user interface (GUI), which may be used to obtain user input in pre-defining information that is to be removed from a history or a server. In this example, window 500 is used to define information that should be removed from a server.

In this example, field 502 contains entries 504, 506, 508, and 510. Entry 504 is a phone number, entry 506 is a social security number, entry 508 is a birthday, and entry 510 is a password. These are strings of information that are removed from a history by the browser in these examples. Additional entries may be defined by selecting "Add" button 512. Entries may be removed by selecting an entry and "Delete" button 514. Additionally, multiple entries may be selected and deleted using "Delete" button 514. Selection of "Done" button 516 closes the window.

Figure 6:
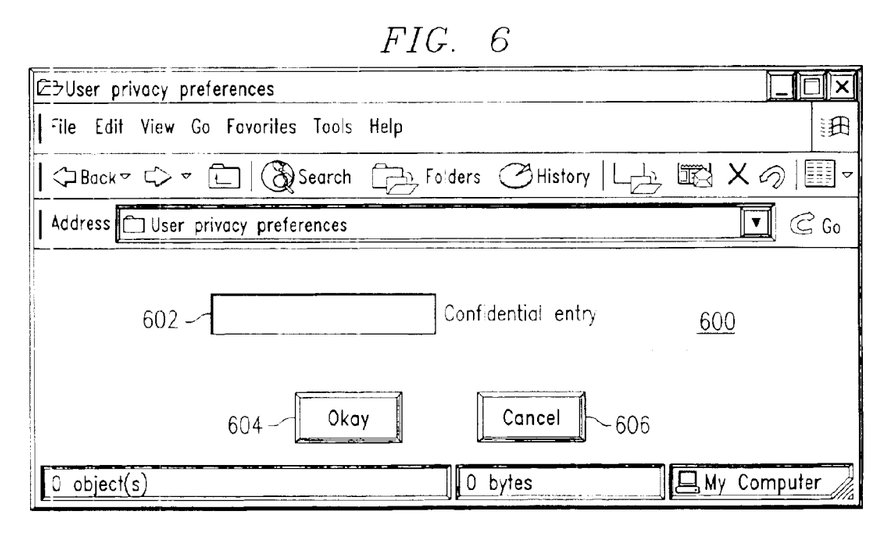
FIG. 6 is a diagram of a input window in accordance with a preferred embodiment of the present invention.

Turning next to FIG. 6, a diagram of a input window is depicted in accordance with a preferred embodiment of the present invention. Window 600 is an example of a window, which may be displayed in response to "Add" button 512 in FIG. 5. Information that is to be removed from a server may be defined or entered in field 602 by a user. The information is entered in the form of a string in these examples. Selection of "Okay" button 604 results in the entry being added to field 502 in FIG. 5. Selection of "Cancel" button 606 results in any input into field 602 being canceled and the closure of window 600.

Figure 7:
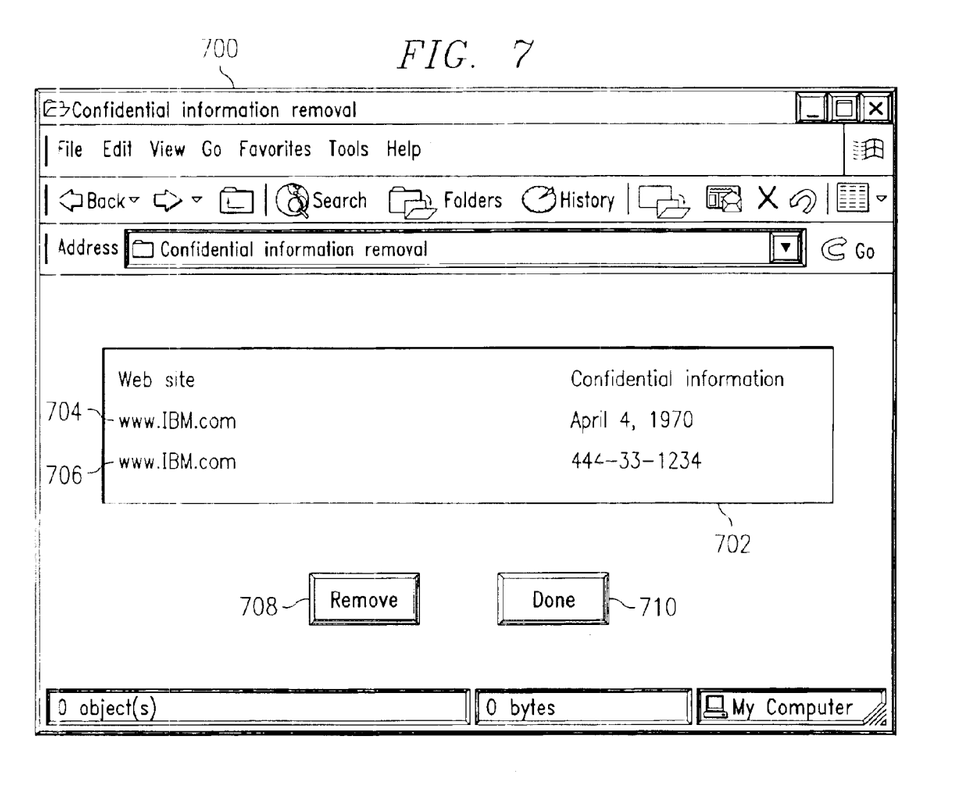
FIG. 7 is a diagram of window used to request removal of information from a server in accordance with a preferred embodiment of the present invention.

With reference now to FIG. 7, a diagram of window used to request removal of information from a server is depicted in accordance with a preferred embodiment of the present invention. Window 700 is an example of a window that may be used to receive user input to request removal of personal or confidential information sent to a server. This window may be displayed to a user when ending a browser session or through some other user input, such as the selection of a control or menu item. Personal or confidential information sent to a server is displayed within field 702. In this example, two entries, entry 704 and entry 706 are displayed within field 702. Each entry identifies the Web site to which the personal or confidential information is sent as well as an identification of the information. The user may select one or more entries from field 702 and selected "Remove" button 708 to request removal of this information. Selection of this button generates a request, which is sent to the server, to remove the selected information. When the user is finished, the user may select "Done" button 710 to close window 700.

Figure 8:
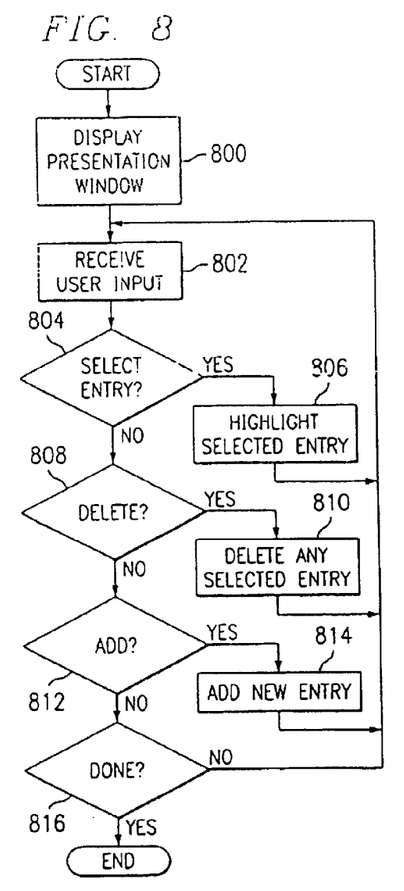
FIG. 8 is a flowchart of a process used for defining information for removal in accordance with a preferred embodiment of the present invention.

Turning next to FIG. 8, a flowchart of a process used for defining information for removal is depicted in accordance with a preferred embodiment of the present invention. The process illustrated in FIG. 8 may be implemented in a browser, such as browser 400 in FIG. 4. In particular, this process may implemented in security process 414 in FIG. 4. These processes are used in conjunction with a GUI, such as those illustrated in FIGS. 5–6.

The process begins by displaying a presentation window (step 800). This presentation window may be, for example, window 500 in FIG. 5. Next, a user input is received (step 802). This user input is typically made through a pointing device, such as, for example, a mouse, a trackball, a touchpad, a light pen, or a keyboard.

A determination is then made as to whether an entry has been selected by the user input (step 804). If an entry has been selected, the selected entry is highlighted (step 806) and the process returns to step 802 as described above.

If an entry has not been selected by the user input, a determination is made as to whether the user input is a selection of a "Delete" button (step 808). If the user input is a selection of a "Delete" button, any selected entries are deleted (step 810) with the process returning the step 802 as described above. Otherwise, a determination is made as to whether the user input is the selection of an "Add" button (step 812). If the user input is the selection of an "Add" button, a new entry is added (step 814) with the process returning to step 802 as described above. This step allows a user to define information that is considered personal or confidential to the user. The adding of the entry may take place using an interface, such as window 600 in FIG. 6. If the user input is not the selection of the "Add" button, then a determination is made as to whether the user input is the selection of a "Done" button (step 816). If the user input is the selection of a "Done" button, the process terminates. Otherwise, the process returns to step 802 as described above.

Figure 9:
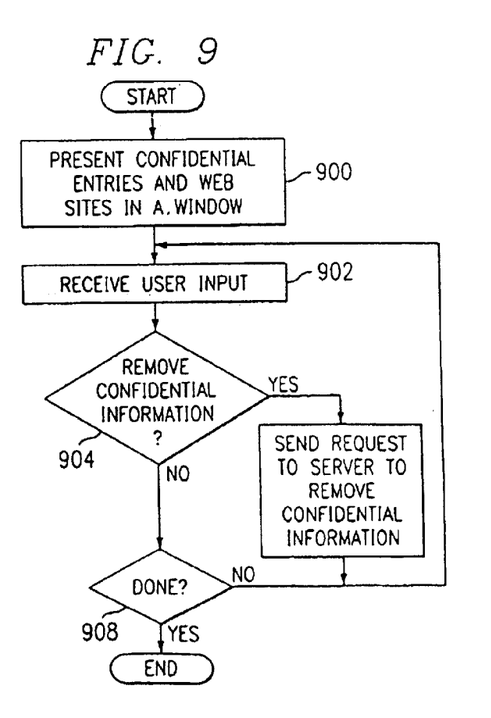
FIG. 9 is a flowchart of a process used for requesting removal of information from a server in accordance with a preferred embodiment of the present invention.

Turning next to FIG. 9, a flowchart of a process used for requesting removal of information from a server is depicted in accordance with a preferred embodiment of the present invention. The process illustrated in FIG. 9 may be implemented in a browser, such as browser 400 in FIG. 4. In particular, this process may implemented in security process 414 in FIG. 4.

The process begins by presenting confidential entries and Web sites in a window to a user (step 900). This presentation is of information sent to a server in which the information has been defined by the user as information that is personal or confidential. Next a user input is received (step 902). A determination is made as to whether the user input is the selection of removal of the confidential information (step 904). If the confidential information is to be removed, a request is sent to the server for removal of the confidential information (step 906). Otherwise, a determination is made as to whether the user input is the selection of a "Done" button (step 908). If the user input is not a selection of a "Done" button, the process returns to step 902 as described. If the user input is the selection of a "Done" button, the process terminates.

The example illustrated in FIG. 9 sends a request to remove all displayed confidential information. The mechanism of the present invention also may receive user input to send a request to remove only entries selected in the window.

Figure 10:
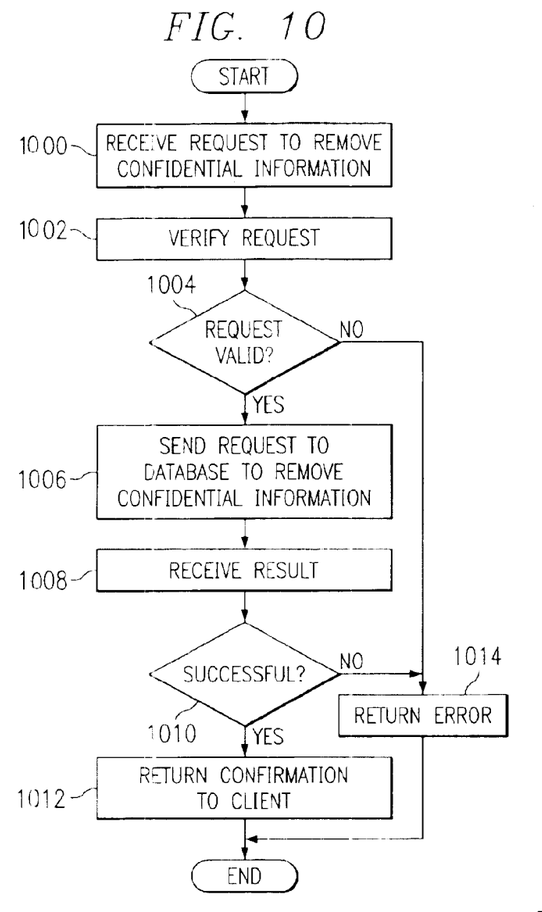
FIG. 10 is a flowchart of a process used for removing information in response to a request in accordance with a preferred embodiment of the present invention.

With reference now to FIG. 10, a flowchart of a process used for removing information in response to a request is depicted in accordance with a preferred embodiment of the present invention. The process illustrated in FIG. 10 may be implemented in a server such as server 400 in FIG. 4. In particular, the process may be implemented in security process 412 in FIG. 4.

The process begins by receiving a request to remove confidential information from a user (step 1000). The request is verified (step 1002). Then, a determination is made as to whether the request to remove confidential information is valid (step 1004). This step is used to ensure that the request is received from the user and not from another source. The validity of a request may be determined a number of ways, such as by using a certificate, a password, or a key. If the request is valid, the request is sent to a database for removal of the confidential information (step 1006). This database may be, for example, client information database 410 in FIG. 4.

Next, a result is received (step 1008), and a determination is made as to whether the removal of the confidential information was successful (step 1010). If removal of the confidential information was successful, a confirmation of the removal is sent to the client (step 1012) with the process terminating thereafter. If the removal of the confidential information was not successful, an error is returned to the client (step 1014) and the process terminates. In some cases, removal of the confidential information from the database may not occur if the confidential information is still required for the transaction.

Figure 11:
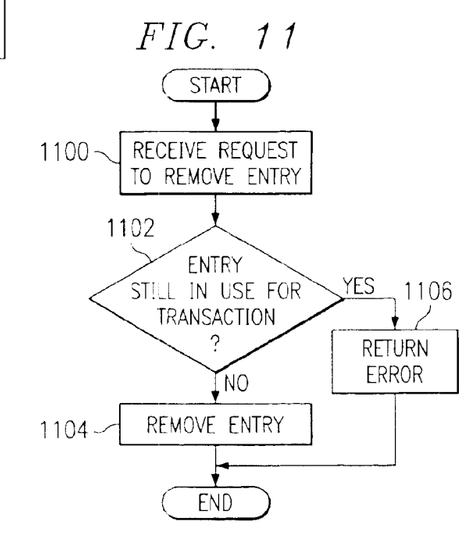
FIG. 11 is a flowchart of a process used for determining whether information can be removed from a database in accordance with a preferred embodiment of the present invention.

Turning next to FIG. 11, a flowchart of a process used for determining whether information can be removed from a database is depicted in accordance with a preferred embodiment of the present invention. The process illustrated in FIG. 11 may be implemented in a database, such as client information database 410 in FIG. 4.

The process begins by receiving a request to remove an entry from the database (step 1100). A determination is made as to whether the entry is still in use for a transaction (step 1102). If the entry is not in use, the entry is removed from the database (step 1104) with the process terminating thereafter. Otherwise, an error is returned (step 1106) with the process terminating thereafter.

Thus, the present invention provides an improved method, apparatus, and computer implemented instructions for managing and removing personal or confidential information from a server. The mechanism of the present invention allows a user to send a request to a server to remove information from the server. This particular mechanism is used for removing traces of personal or confidential information, such as a credit card number or a social security number.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing information, the method comprising:

receiving information from a plurality of users;

storing the information to form stored information;

receiving a request to remove selected information from the stored information from a user within the set of users, wherein the selected information is received in response to a transaction involving the user, wherein the stored information is information stored on a server;

responsive to receiving the request, determining if the selected information is no longer required for the transaction; and responsive to the selected information no longer being required for the transaction, removing the selected non-required information from the stored information.

2. The method of claim 1, wherein the step of receiving a request includes:

determining whether the request is a valid request; and preventing removing of the selected information in response to a determination that the request is an invalid request.

3. The method of claim 1, wherein at least one of a certificate, a password, and a key is used to determine whether the request is valid.

4. The method of claim 1, wherein the selected information is personal information about the user.

5. The method of claim 4, wherein the personal information include at least one of a user name, a user identification, a password, a telephone number, an c-mail address, a physical address, a social security number, a birth, date, and a credit card number.

6. The method of claim 1, wherein the transaction is a commercial transaction involving a credit card number.

7. The method of claim 1, wherein the request sent to the user is in a form of an applet requesting personal information about the user.

8. A method in a data processing system for managing information, the method comprising:

sending a Web page to a user at a client;

receiving a response, wherein the response include the information;

processing a business transaction with the client using the information;

storing the information to form stored information, wherein the stored information is information stored on a server;

receiving a request to remove the stored information;

determining that the stored information is unnecessary to the business transaction in response to receiving the request; and removing the stored information in response to the stored information no longer being necessary to the business transaction.

9. The method of claim 8, wherein the business transaction is a purchase of an item using a credit card.

10. A data processing system comprising:

a bus system;

a communications unit connected to the bus system;

a memory connected to the bus system, wherein the memory includes a set of instructions; and a processing unit connected to the bus system, wherein the processing unit executes the set of instructions to receive information from a plurality of users; store the information to form stored information, wherein the stored information is information stored on a server; receive a request to remove selected information from the stored information from a user within the set of users, wherein the selected information is received in response to a transaction involving the user; determine by the data processing system if the selected information is no longer required for the transaction, in response to received request; and by the data processing system the non-required information from the stored information in response to the selected information no longer being required for the transaction.

11. A data processing system comprising:

a bus system;

a communications unit connected to the bus system;

a memory connected to the bus system, wherein the memory includes a set of instructions; and a processing unit connected to the bus system, wherein the processing unit executes the set of instructions to send a Web page to a user at a client; receive a response, wherein the response include the information; process a business transaction with the client using the information; store the information to form stored information, wherein the stored information is information stored on a server; receive a request to remove the stored information; determine that the stored information is unnecessary to the business transaction in response to receiving the request; and remove by the data processing system the stored information in response to the stored information no longer being necessary to the business transaction.

12. A data processing system for managing information, the data processing system comprising:

first receiving means for receiving information from a plurality of users;

storing means for storing the information to form stored information, wherein the stored information is information stored on a server;

second receiving means for receiving a request to remove selected information from the stored information from a user within the set of users, wherein the selected information is received in response to a transaction involving the user;

determining means for responsive to receiving a request, determining if the selected information is no longer required for the transaction; and removing means for responsive to the selected information no longer being required for the transaction, removing the selected non-required information from the stored information.

13. The data processing system of claim 12, wherein the second receiving means includes:
   means for determining whether the request is a valid request; and
   means for preventing removing of the selected information in response to a determination that the request is an invalid request.

14. The data processing system of claim 12, wherein at least one of a certificate, a password, and a key is used to determine whether the request is valid.

15. The data processing system of claim 12, wherein the selected information is personal information about the user.

16. The data processing system of claim 15, wherein the personal information includes at least one of a user name, a user identification, a password, a telephone number, an e-mail address, a physical address, a social security number, a birth date, and a credit card number.

17. The data processing system of claim 12, wherein the transaction is a commercial transaction involving a credit card number.

18. The data processing system of claim 12, wherein the request sent to the user is in a form of an applet requesting personal information about the user.

19. A data processing system for managing information, the data processing system comprising:
   sending means for sending a Web page to a user at a client;
   first receiving means for receiving a response; wherein the response include the information;
   processing means for processing a business transaction with the client using the information; storing means for storing the information to form stored information, wherein the stored information is information stored on a server;
   second receiving means for receiving a request to remove the stored information;
   determining means for determining that the stored information is unnecessary to the business transaction in response to receiving the request; and
   removing means for removing the stored information in response to the stored information no longer being necessary to the business transaction.

20. The data processing system of claim 19, wherein the business transaction is a purchase of an item using a credit card.

21. A computer program product in a computer readable recording medium for managing information, the computer program product comprising:
   first instructions for receiving information from a plurality of users;
   second instructions for storing the information to form stored information, wherein the stored information is information stored on a server;
   third instructions for receiving a request to remove selected information from the stored information from a user within the set of users, wherein the selected information is received in response to a transaction involving the user;
   fourth instructions, responsive to receiving the request, for determining by a data processing system if the selected information is no longer required for the transaction; and
   fifth instructions, responsive to the selected information no longer being required for the transaction, for removing the selected non-required information from the stored information.

22. A computer program product in a computer readable medium for managing information, the computer program product comprising:
   first instructions for sending a Web page to a user at a client;
   second instructions for receiving a response, wherein the response include the information;
   third instructions for processing a business transaction with the client using the information;
   fourth instructions for storing the information to form stored information, wherein the stored information is information stored on a server;
   fifth instructions for receiving a request to remove the stored information;
   sixth instructions for determining that the stored information is unnecessary to the business transaction in response to receiving the request; and
   seventh instructions for removing the stored information in response to the stored information no longer being necessary to the business transaction.

23. The method of claim 1, wherein the request to remove selected information originates from a client device of the user.

24. The method of claim 8, wherein the request to remove stored information originates from a client device of the user.

25. The method of claim 12, wherein the request to remove selected information originates from a client device of the user.

26. The method of claim 19,wherein the request to remove stored information originates from a client device of the user.

* * * * *